United States Patent
Lai

(10) Patent No.: US 7,023,035 B2
(45) Date of Patent: Apr. 4, 2006

(54) [THIN FILM TRANSISTOR ARRAY SUBSTRATE AND REPAIRING METHOD THEREOF]

(75) Inventor: Han-Chung Lai, Taoyuan Hsien (TW)

(73) Assignee: Au Optronics Corporation, Hsinchu (TW)

( * ) Notice: Subject to any disclaimer, the term of this patent is extended or adjusted under 35 U.S.C. 154(b) by 0 days.

(21) Appl. No.: 10/710,158

(22) Filed: Jun. 23, 2004

(65) Prior Publication Data

US 2005/0253144 A1 Nov. 17, 2005

(30) Foreign Application Priority Data

Apr. 23, 2004 (TW) .................................. 9311175 A

(51) Int. Cl.
*H01L 31/062* (2006.01)
(52) U.S. Cl. ...................... 257/292; 257/225; 257/226; 257/235; 257/291; 257/439; 257/443
(58) Field of Classification Search ............ 349/38–39, 349/45–47, 139–144
See application file for complete search history.

(56) References Cited

U.S. PATENT DOCUMENTS 5,475,246 A * 12/1995 Wei et al. .................... 257/291
6,753,935 B1 * 6/2004 Wu .............................. 349/54

* cited by examiner

*Primary Examiner*—Long Pham
*Assistant Examiner*—Wai-Sing Louie
(74) *Attorney, Agent, or Firm*—Jiang Chyun IP Office

(57) ABSTRACT

A thin film transistor (TFT) array substrate including a substrate, a plurality of scan lines, a plurality of data lines, a plurality of thin film transistors, a plurality of pixel electrodes and a repairing circuit is provided. The scan lines and the data lines are disposed over the substrate, therefore a plurality of pixel areas are defined. Each thin film transistor is disposed in each pixel area respectively and driven by the corresponding scan line and data line. Each pixel electrode is disposed in each pixel area respectively and electrically connected to the corresponding thin film transistor. A repairing method for TFT array substrate is also provided. The method includes connecting the repairing circuit and the defect scan line besides the break to repair and convert the line defect into two-point defect, single defect, or totally repair the line defect.

14 Claims, 13 Drawing Sheets

[THIN FILM TRANSISTOR ARRAY SUBSTRATE AND REPAIRING METHOD THEREOF]

CROSS REFERENCE TO RELATED APPLICATIONS

This application claims the priority benefit of Taiwan application serial no. 9311175, filed Apr. 23, 2004.

BACKGROUND OF INVENTION

1. Field of the Invention

The present invention relates to a thin film transistor (TFT) array substrate and a repairing method thereof. More particularly, the present invention relates to a TFT array substrate and a repairing method thereof for repairing a break of the scan line or the common line of the substrate.

2. Description of the Related Art

Recently, a variety of factories have exerted great effort on the development of display device since the requirement and the market of display device has grown rapidly. Conventionally, since the cathode ray tube (CRT) is fully developed and has good display quality, the CRT has been adopted in a variety of application. However, the CRT has the disadvantages of high power consumption, heavy weight, larger size and high radiation and can not meet the requirement of environmental protection. Therefore, the thin film transistor liquid crystal display (TFT-LCD) has been developed and become the major trend of the display device due to the advantages of high definition, small size, thin thickness, low power consumption, radiation free.

Conventionally, TFT LCD is mainly constructed by thin film transistor (TFT) array substrate, color filter array substrate and liquid crystal layer. The TFT array substrate is constructed by a plurality of thin film transistors and pixel electrodes disposed corresponding to the thin film transistors. The thin film transistors are adopted as the switching component of the pixel units of the liquid crystal display. The pixel unit is selected and controlled via the corresponding scan line and data line. Then, an applicable operation voltage is applied to the pixel unit to display a displaying data on the pixel. Generally, a portion of the pixel electrode described above is covered on the scan line or the common line, and the overlapped portion of the pixel electrodes is adopted as a storage capacitor (Cst). Therefore, the pixels of the TFT LCD may be operated for displaying the images by the storage capacitors.

It is noted that, a problem of line defect may be generated in the conventional TFT array substrate due to the break of the lines such as the scan line or the common line of the TFT array substrate. Therefore, the TFT array substrate is damaged and may be withdrawn.

SUMMARY OF INVENTION

Therefore, the present invention is directed to a TFT array substrate and a repairing method thereof for repairing a break of the scan line or the common line to avoid the withdrawal of the TFT array substrate.

In accordance with one embodiment of the present invention, a thin film transistor (TFT) array substrate including a substrate, a plurality of scan lines, a plurality of data lines, a plurality of thin film transistors, a plurality of pixel electrodes and a repairing circuit is provided. The scan lines are disposed over the substrate and include at least a defect scan line having a break, and the data lines are disposed over the substrate. Therefore, a plurality of pixel areas are defined by the scan lines and the data lines. Each thin film transistor is disposed in one of the pixel areas, and the thin film transistors are connected with and driven via the scan lines and the data lines. Each pixel electrode is disposed in one of the pixel areas and electrically connected to one of the thin film transistors correspondingly, and a portion of each of the pixel electrodes is disposed over one of the scan lines correspondingly to construct a storage capacitor. The repairing circuit is disposed over the break for electrically connecting the defect scan line at two sides of the break, wherein the repairing circuit is electrically insulated with the pixel electrodes.

In accordance with one embodiment of the present invention, a thin film transistor (TFT) array substrate including a substrate, a plurality of scan lines, a plurality of data lines, a plurality of thin film transistors, a plurality of pixel electrodes and a repairing circuit is provided. The scan lines are disposed over the substrate and include at least a defect scan line having a break, the data lines are disposed over the substrate. Therefore, a plurality of pixel areas are defined by the scan lines and the data lines. Each thin film transistor is disposed in one of the pixel areas, and the thin film transistors are connected with and driven via the scan lines and the data lines. Each pixel electrode is disposed in one of the pixel areas and electrically connected to one of the thin film transistors correspondingly, and a portion of each of the pixel electrodes is disposed over one of the scan lines correspondingly to construct a storage capacitor. The repairing circuit is disposed over the break, wherein the repairing circuit and at least one of the pixel electrodes is electrically connected with the defect scan lines at two sides of the break.

In accordance with one embodiment of the present invention, a thin film transistor (TFT) array substrate including a substrate, a plurality of scan lines, a plurality of data lines, a plurality of thin film transistors and a plurality of pixel electrodes is provided. The scan lines are disposed over the substrate and include at least a defect scan line having a break, and the data lines are disposed over the substrate. Therefore, a plurality of pixel areas are defined by the scan lines and the data lines. Each thin film transistor is disposed in one of the pixel areas, and the thin film transistors are connected with and driven via the scan lines and the data lines. Each pixel electrode is disposed in one of the pixel areas and electrically connected to one of the thin film transistors correspondingly, and a portion of each of the pixel electrodes is disposed over one of the scan lines correspondingly to construct a storage capacitor. Therefore, at least one of the pixel electrodes is electrically connected to the defect scan line at two sides of the break.

In accordance with one embodiment of the present invention, a thin film transistor (TFT) array substrate including a substrate, a plurality of scan lines, a plurality of data lines, a plurality of thin film transistors, a plurality of pixel electrodes, a plurality of common line and a repairing circuit is provided. The scan lines and the data lines are disposed over the substrate, therefore a plurality of pixel areas are defined by the scan lines and the data lines. Each thin film transistor is disposed in one of the pixel areas, and the thin film transistors are connected with and driven via the scan lines and the data lines. Each pixel electrode is disposed in one of the pixel areas and electrically connected to one of the thin film transistors correspondingly. The common lines are disposed over the substrate, and a portion of each of the pixel electrodes is disposed over one of the common lines correspondingly to construct a storage capacitor, wherein the common lines comprise at least a defect common line comprising a break. The repairing circuit is disposed over the break for electrically connecting the defect scan line at two sides of the break, wherein the repairing circuit is electrically insulated with the pixel electrodes.

In accordance with one embodiment of the present invention, a thin film transistor (TFT) array substrate including a substrate, a plurality of scan lines, a plurality of data lines, a plurality of thin film transistors, a plurality of pixel electrodes, a plurality of common line and a repairing circuit is provided. The scan lines and the data lines are disposed over the substrate, therefore a plurality of pixel areas are defined by the scan lines and the data lines. Each thin film transistor is disposed in one of the pixel areas, and the thin film transistors are connected with and driven via the scan lines and the data lines. Each pixel electrode is disposed in one of the pixel areas and electrically connected to one of the thin film transistors correspondingly. The common lines are disposed over the substrate, and a portion of each of the pixel electrodes is disposed over one of the common lines correspondingly to construct a storage capacitor, wherein the common lines comprise at least a defect common line comprising a break. The repairing circuit is disposed over the break, wherein the repairing circuit and at least one of the pixel electrodes are electrically connected to the defect common line at two sides of the break.

In accordance with one embodiment of the present invention, a thin film transistor (TFT) array substrate including a substrate, a plurality of scan lines, a plurality of data lines, a plurality of thin film transistors, a plurality of pixel electrodes and a plurality of common line is provided. The scan lines and the data lines are disposed over the substrate, therefore a plurality of pixel areas are defined by the scan lines and the data lines. Each thin film transistor is disposed in one of the pixel areas, and the thin film transistors are connected with and driven via the scan lines and the data lines. Each pixel electrodes is disposed in one of the pixel areas and electrically connected to one of the thin film transistors correspondingly. The common lines are disposed over the substrate, and a portion of each of the pixel electrodes is disposed over one of the common lines correspondingly to construct a storage capacitor, wherein the common lines comprise at least a defect common line comprising a break. In addition, at least one of the pixel electrodes is electrically connected to the defect common line at two sides of the break.

In accordance with one embodiment of the present invention, a repairing method of a thin film transistor (TFT) array substrate for repairing a TFT array substrate comprising a storage capacitor on a gate (Cst on gate) or a storage capacitor on a common line (Cst on common) is provided. The repairing method includes, for example but not limited to, the following steps. First, a portion of at least one pixel electrode adjacent to a break of a scan line or a common line is removed. Then, a repairing circuit over the break is formed to electrically connect the repairing circuit and the scan line at two sides of the break or electrically connect the repairing circuit and the common line at two sides of the break, wherein the repairing circuit is electrically insulated with the pixel electrodes.

In accordance with one embodiment of the present invention, a repairing method of a thin film transistor (TFT) array substrate for repairing a TFT array substrate comprising a storage capacitor on a gate or a storage capacitor on a common line is provided. The repairing method includes, for example but not limited to, the following steps. Wherein, a portion of at least one pixel electrode adjacent to a break of a scan line or a common line is removed to electrically connect a portion of the pixel electrode with the scan line or the common line at two sides of the break.

In accordance with one embodiment of the present invention, a repairing method of a thin film transistor (TFT) array substrate for repairing a TFT array substrate comprising a storage capacitor on a gate or a storage capacitor on a common line is provided. The repairing method includes, for example but not limited to, the following steps. Wherein, at least one pixel electrode adjacent to a break of a scan line or a common line is electrically connected to the scan line or the common line at two sides of the break.

Accordingly, the present invention provides a repairing circuit for repairing the break of the scan line or the common line of the TFT array substrate. The defect scan line or the defect common line is repaired by electrically connecting the repairing circuit to the scan line or the common line at two sides of the break. In addition, the defect scan line or the defect common line may also be repaired by directly connecting the pixel electrode disposed over the break top to the scan line or the common line at two sides of the break.

One or parts or all of these and other features and advantages of the present invention will become readily apparent to those skilled in this art from the following description wherein there is shown and described a preferred embodiment of this invention, simply by way of illustration of one of the modes best suited to carry out the invention. As it will be realized, the invention is capable of different embodiments, and its several details are capable of modifications in various, obvious aspects all without departing from the invention. Accordingly, the drawings and descriptions will be regarded as illustrative in nature and not as restrictive.

BRIEF DESCRIPTION OF DRAWINGS

The accompanying drawings are included to provide a further understanding of the present invention, and are incorporated in and constitute a part of this specification. The drawings illustrate embodiments of the present invention and, together with the description, serve to explain the principles of the present invention.

DETAILED DESCRIPTION

The present invention will be described fully hereinafter with reference to the accompanying drawings, in which preferred embodiments of the present invention are illustrated. The present invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements in the accompanying drawings throughout.

Figure 1:
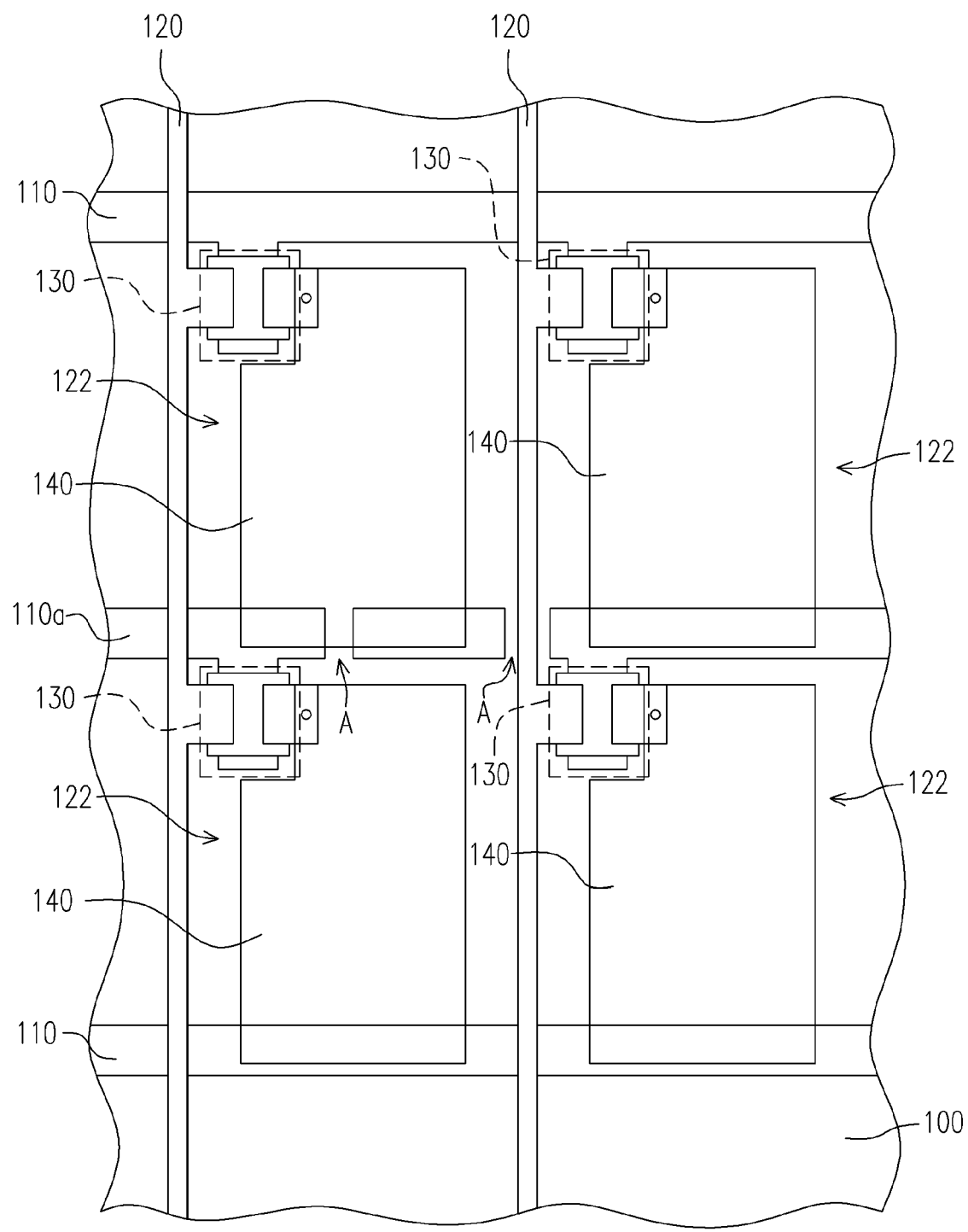
FIG. 1 is a schematic top view illustrates a thin film transistor (TFT) array substrate of storage capacitor on a gate according to one embodiment of the present invention.

FIG. 1 is a schematic top view illustrates a thin film transistor (TFT) array substrate of a storage capacitor on a gate according to one embodiment of the present invention.

Referring to FIG. 1, a thin film transistor (TFT) array substrate comprises, for example but not limited to, a substrate 100, a plurality of scan lines 110, a plurality of data lines 120, a plurality of thin film transistors 130 and a plurality of pixel electrodes 140.

The scan lines 110 and the data lines 120 are disposed over the substrate 100, and a plurality of pixel areas 122 are defined by the scan lines 110 and the data lines 120. Each thin film transistor 130 is disposed in the corresponding pixel area 122, and the thin film transistors 130 are connected with and driven via the scan lines 110 and the data lines 120. Each pixel electrode 140 is disposed in the corresponding pixel area 122 to be electrically connected to the corresponding thin film transistor 130. In addition, a portion of each pixel electrode 140 is disposed over the corresponding scan line 110 to construct a storage capacitor. Therefore, the storage capacitor is constructed by the coupling of the scan line 110 and the pixel electrode 140 over the scan line 110, wherein a dielectric layer, for example but not limited to, a gate isolation layer and/or a protection layer is disposed between the scan line 110 and the pixel electrode 140.

It is noted that, sometimes at least a defect scan line 110a may be generated in the scan lines 110 due to the defect in the process or other reasons. The defect scan line 110a generally comprises at least a break A. When a defect scan line 110a is generated in the scan lines 110, the pixel electrodes 140 connected after the break of the defect scan line 110a dont work for displaying normally. Hereinafter, in the present invention, a break A of the defect scan line 110a disposed between any two data lines 120 or under any data line 120 will be illustrated as an exemplary embodiment. In addition, a plurality of repairing methods for repairing the defect scan line 110a will also be described. However, the present invention should not be limited to the embodiments and the descriptions of the invention.

FIG. 2A to FIG. 2F are top views schematically illustrating a repairing method corresponding to the defect scan line shown in FIG. 1 according to embodiments of the present invention.

Figure 2A:
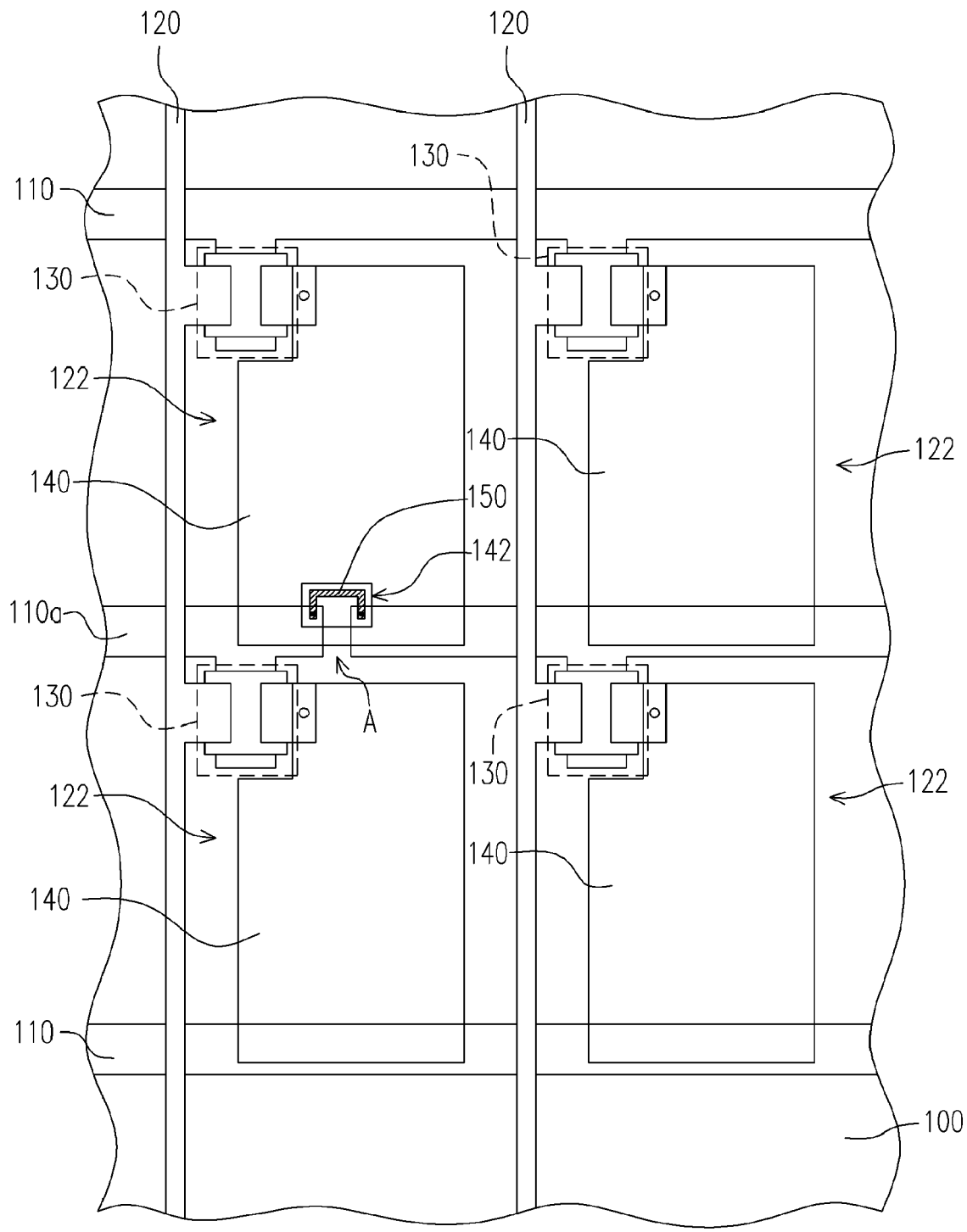
FIG. 2A to FIG. 2F are top views schematically illustrating a method for repairing the defect scan line shown in FIG. 1 according to embodiments of the present invention.

Referring to FIG. 2A, if the break A of the defect scan line 110a is disposed between any two of the data lines 120, the defect scan line 110a may be repaired by, for example but not limited to, the following steps. First, a portion of the pixel electrode 140 above the break A is removed by using, for example but not limited to, a laser removing method. In one embodiment of the present, an opening 142 may be formed after the portion of the pixel electrode 140 is removed. Thereafter, a repairing circuit 150 may be formed in the opening 142 by using, for example but not limited to, a laser chemical vapor deposition (CVD) method. It is noted that, the repairing circuit 150 and the defect scan line 110a at two sides of the break A are electrically connected by using, for example but not limited to, a laser welding method.

Figure 2B:
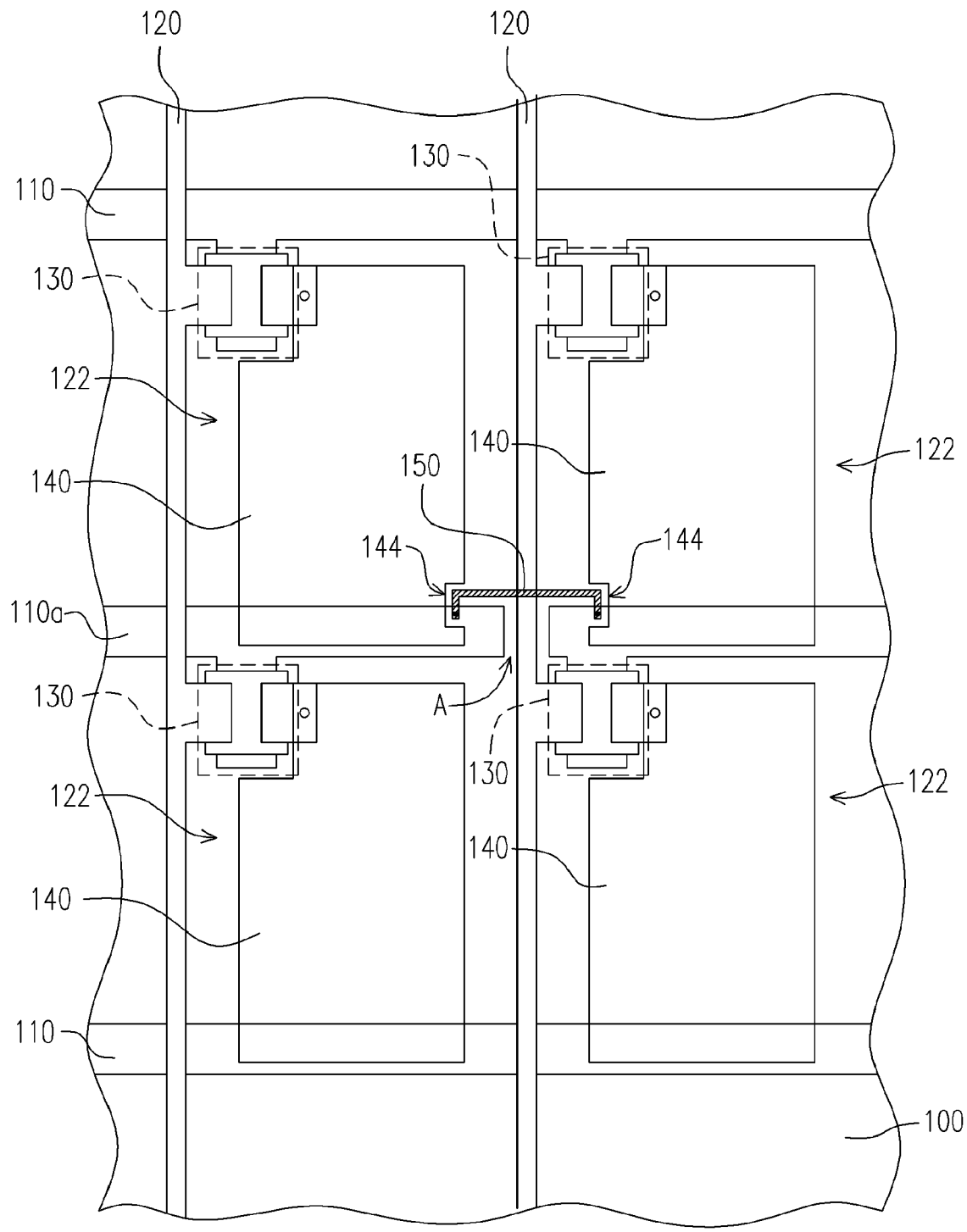

Alternatively, referring to FIG. 2B, if the break A of the defect scan line 110a is disposed under one of the data lines 120, the defect scan line 110a may be repaired by, for example but not limited to, the following steps. First, a portion of two pixel electrodes 140 adjacent to the break A is removed by using, for example but not limited to, a laser removing method. In one embodiment of the present invention, a gap 144 may be formed by removing the edges of the two pixel electrodes 140 respectively. In addition, a repairing circuit 150 is formed in the gap 144 and crosses over the data line 120 by using, for example but not limited to, a laser chemical vapor deposition (CVD) method. It is noted that, the repairing circuit 150 and the defect scan line 110a at two sides of the break A are electrically connected by using, for example but not limited to, a laser welding method.

Accordingly, in the repairing method illustrated in FIG. 2A or FIG. 2B, since the repairing circuit 150 and the repaired pixel electrodes 140 are electrically insulated mutually, the repaired pixel electrode 140 can be used for displaying normally.

Figure 2C:
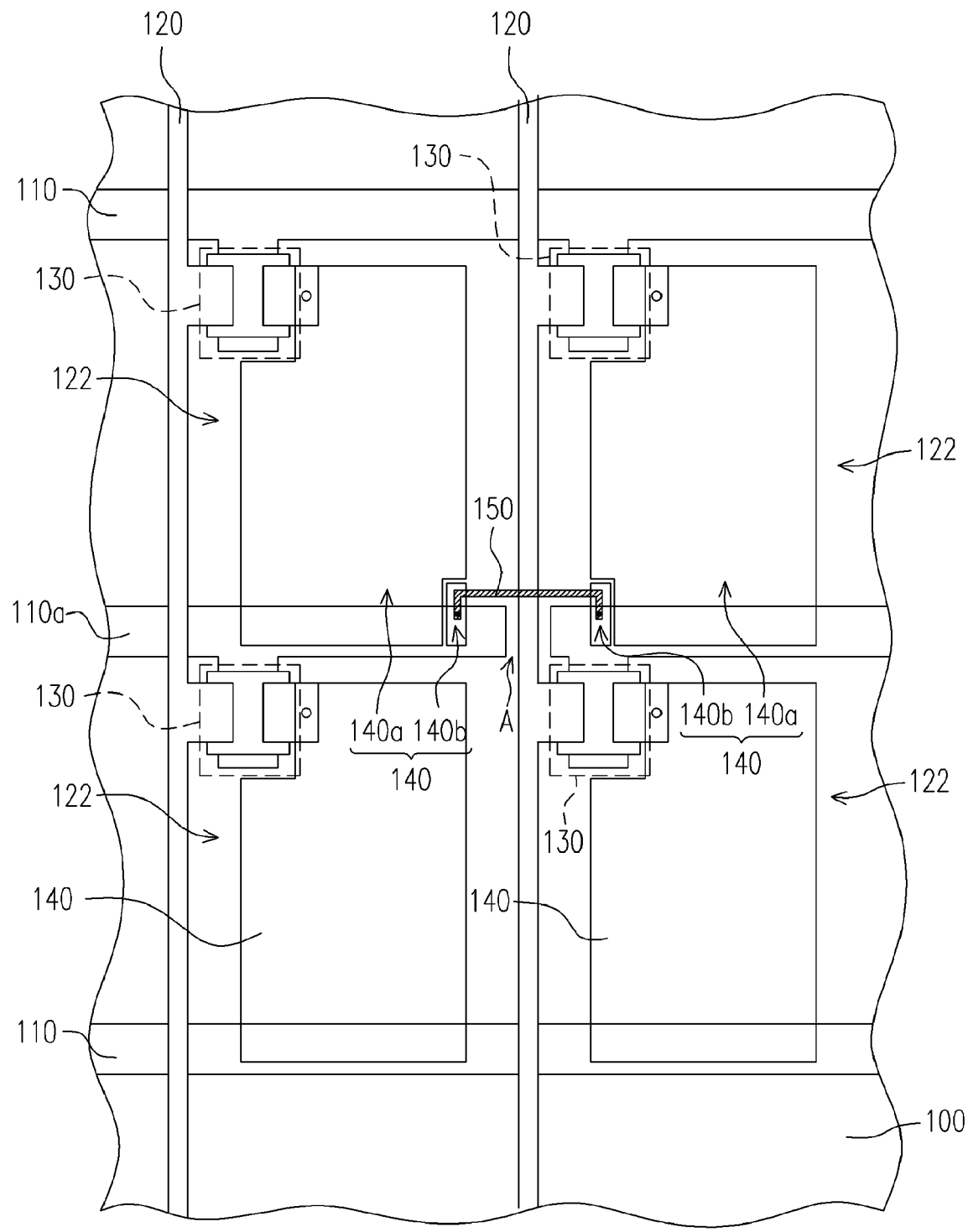

Moreover, referring to FIG. 2C, when the break A of the defect scan line 110a is disposed under one of the data lines 120, the defect scan line 110a may be repaired by, for example but not limited to, the following steps. First, the two pixel electrodes 140 adjacent to the break A are divided into a displaying portion 140a and a repairing portion 140b, wherein the displaying portion 140a and the repairing portion 140b are electrically insulated. In one embodiment of the present embodiment, the two pixel electrodes 140 are divided by using, for example but not limited to, a laser removing method. In addition, a repairing circuit 150 is formed over the break A, therefore the repairing circuit 150 and the repairing portion 140b may be electrically connected to the defect scan line 110a at two sides of the break A. It is noted that, the repairing circuit 150 is electrically connected to the defect scan line 110a at two sides of the break A and the repairing portion 140b by using, for example but not limited to, a laser welding method.

Figure 2D:
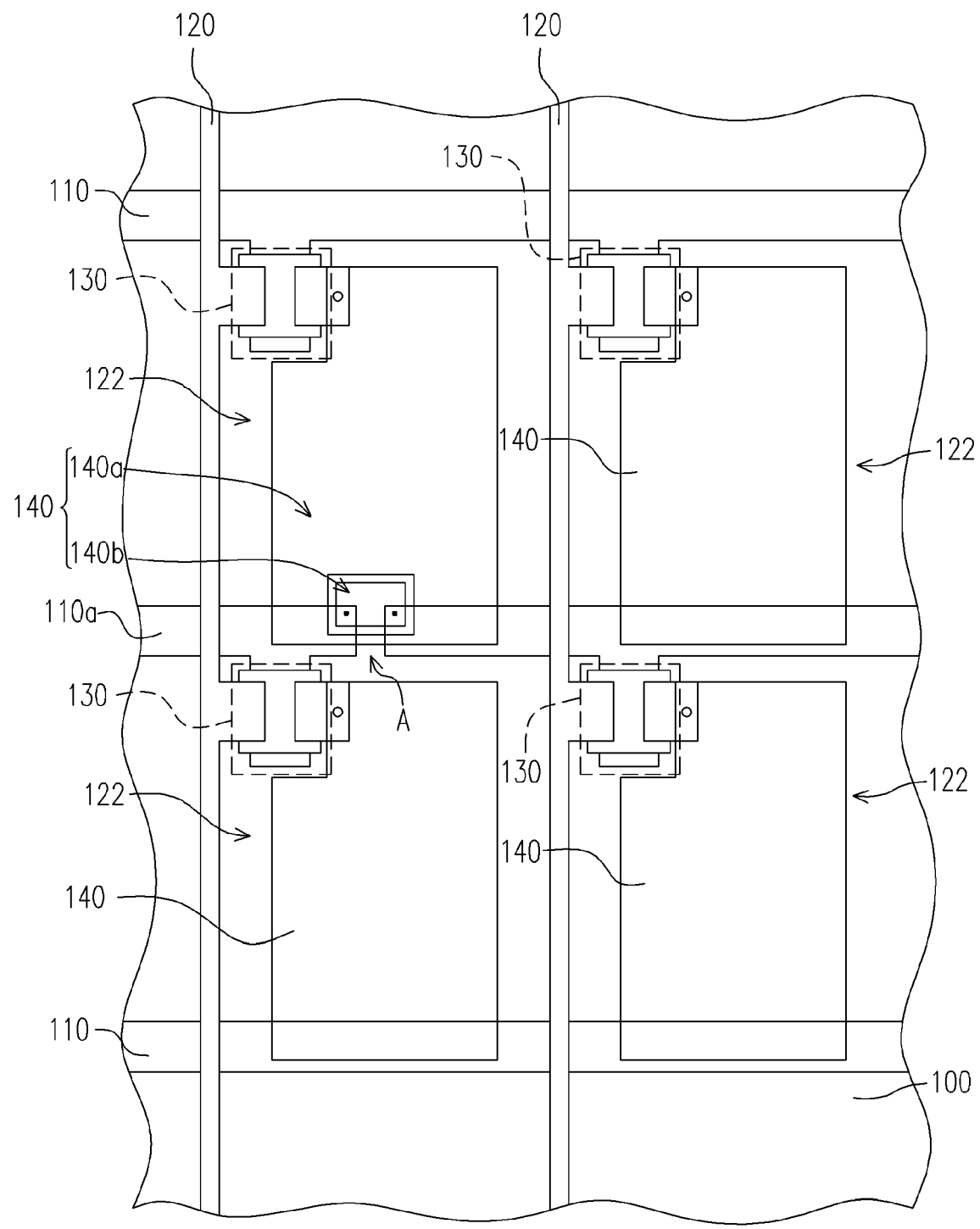

Alternatively, referring to FIG. 2D, when the break A of the defect scan line 110a is disposed between any two data lines 120, the defect scan line 110a may be repaired by, for example but not limited to, the following method. First, the pixel electrode 140 over the break A is divided into a displaying portion 140a and a repairing portion 140b surrounded by the displaying portion 140a. The displaying portion 140a and the repairing portion 140b are electrically insulated. In one embodiment of the present invention, the pixel electrode 140 is divided by using, for example but not limited to, a laser removing method. Thereafter, the repairing portion 140b is electrically connected to the defect scan line 110a at two sides of the break A. In one embodiment of the present invention, the repairing portion 140b and the defect scan line 110a at two sides of the break A are electrically connected by using, for example but not limited to, a laser welding method.

Accordingly, in the repairing method shown in FIG. 2C and FIG. 2D, the pixel electrode 140 adjacent to the break A is divided into the displaying portion 140a and the repairing portion 140b. Then, the repairing portion 140b is electrically connected to the defect scan line 110a at two sides of the break A, therefore the break A is repaired. It is noted that, since the displaying portion 140a and the repairing portion 140b of the pixel electrode 140 are electrically insulated mutually, the displaying portion 140a of the pixel electrode 140 can also be used for displaying normally and is not influenced by the repairing process.

Figure 2E:
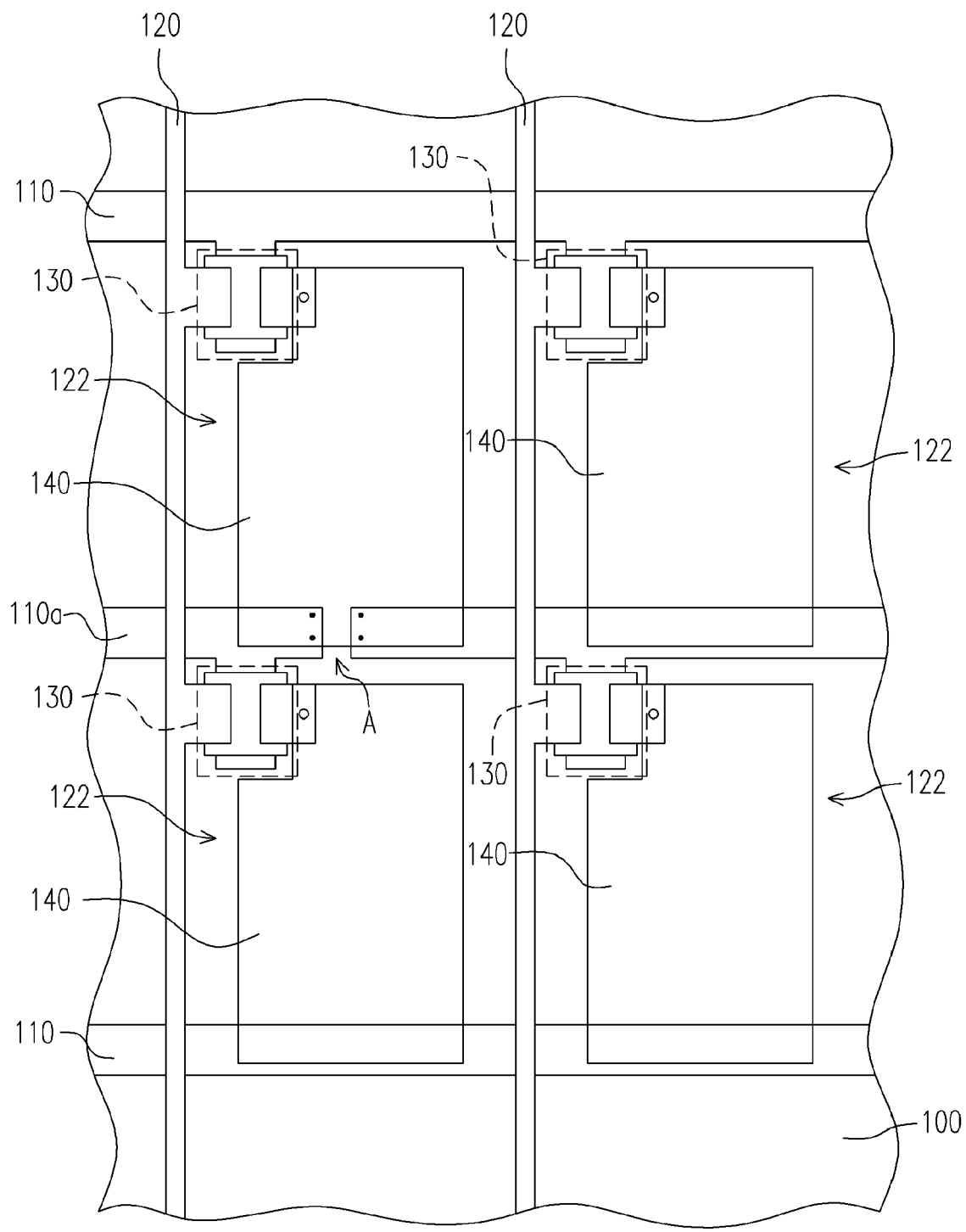

Referring to FIG. 2E, when the break A of the defect scan line 110a is disposed between any two of the data lines 120, the defect scan line 110a may be repaired by, for example but not limited to, a laser welding method to electrically connect the pixel electrode 140 over the break A and the defect scan line 110a at two sides of the break A directly. Therefore, since the defect scan line 110a is repaired by the pixel electrode 140 over the break A, the line defect may be repaired and converted into a single defect.

Figure 2F:
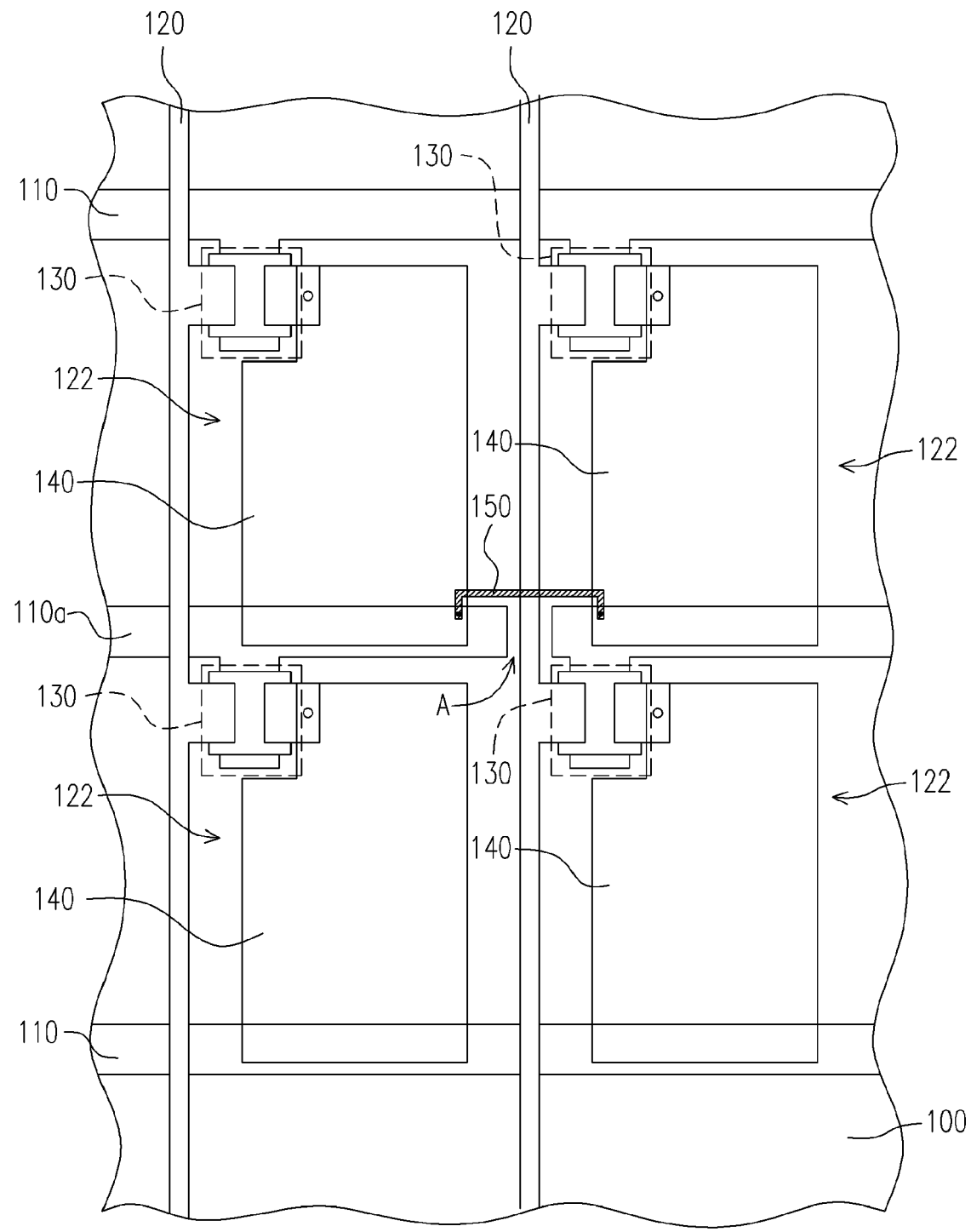

Alternatively, referring to FIG. 2F, when the break A of the defect scan line 110a is disposed under one of the data lines 120, the defect scan line 110a may be repaired by, for example but not limited to, forming a repairing circuit 150 over the break A. In one embodiment of the present invention, the repairing circuit 150 is formed by, for example but not limited to, a laser chemical vapor deposition (CVD) method. It is noted that, the repairing circuit 150 is electrically connected to the defect common line 110a at two sides of the break A and the pixel electrode 140 at two sides of the break A by using, for example but not limited to, a laser welding method.

Accordingly, in the repairing method illustrated in FIG. 2E and FIG. 2F, the line defect can be repaired by electrically connecting the pixel electrode 140 to the defect scan line 110a at two sides of the break A directly.

Accordingly, the embodiments described above are provided for repairing the break of the defect scan line. However, the repairing method of the present invention is not only limited to the method of repairing the defect scan line, but also can be provided for repairing. For example but not limited to, the defect common line of the TFT array substrate. In general, the common line is disposed between every two adjacent scan lines, and the common line may be covered by a portion of the pixel electrode to form a storage capacitor on a common line (Cst on common). Therefore, when the defect common line of the common line is broken, a problem of line defect is also generated. Therefore, the present invention provides another repairing method for repairing the defect common line.

FIG. 3A to FIG. 3F are top views schematically illustrating a method for repairing a defect common line according to embodiments of the present invention. The TFT array substrate shown in FIG. 3A to FIG. 3F comprises a TFT array substrate of a storage capacitor on a common line (Cst on common) and has a structure similar to FIG. 2A to FIG. 2F. Therefore, only the technology different to the embodiments described above will be described in detail hereinafter.

In the structure of a storage capacitor on a common line (Cst on common), a common line 160 is disposed between any two adjacent scan lines 110 of the substrate 100. The storage capacitor (not shown) in each pixel is constructed from a portion of the pixel electrode 140 and the common line 160 over the pixel electrode 140. Similarly, the common line 160 and the pixel electrode 140 are generally separated by a dielectric layer (not shown), for example but not limited to, a gate isolation layer (not shown) and/or a protection layer (not shown). In general, at least a defect common line 160a may be formed in the common lines 160, and the defect common line 160a comprises a break B.

Figure 3A:
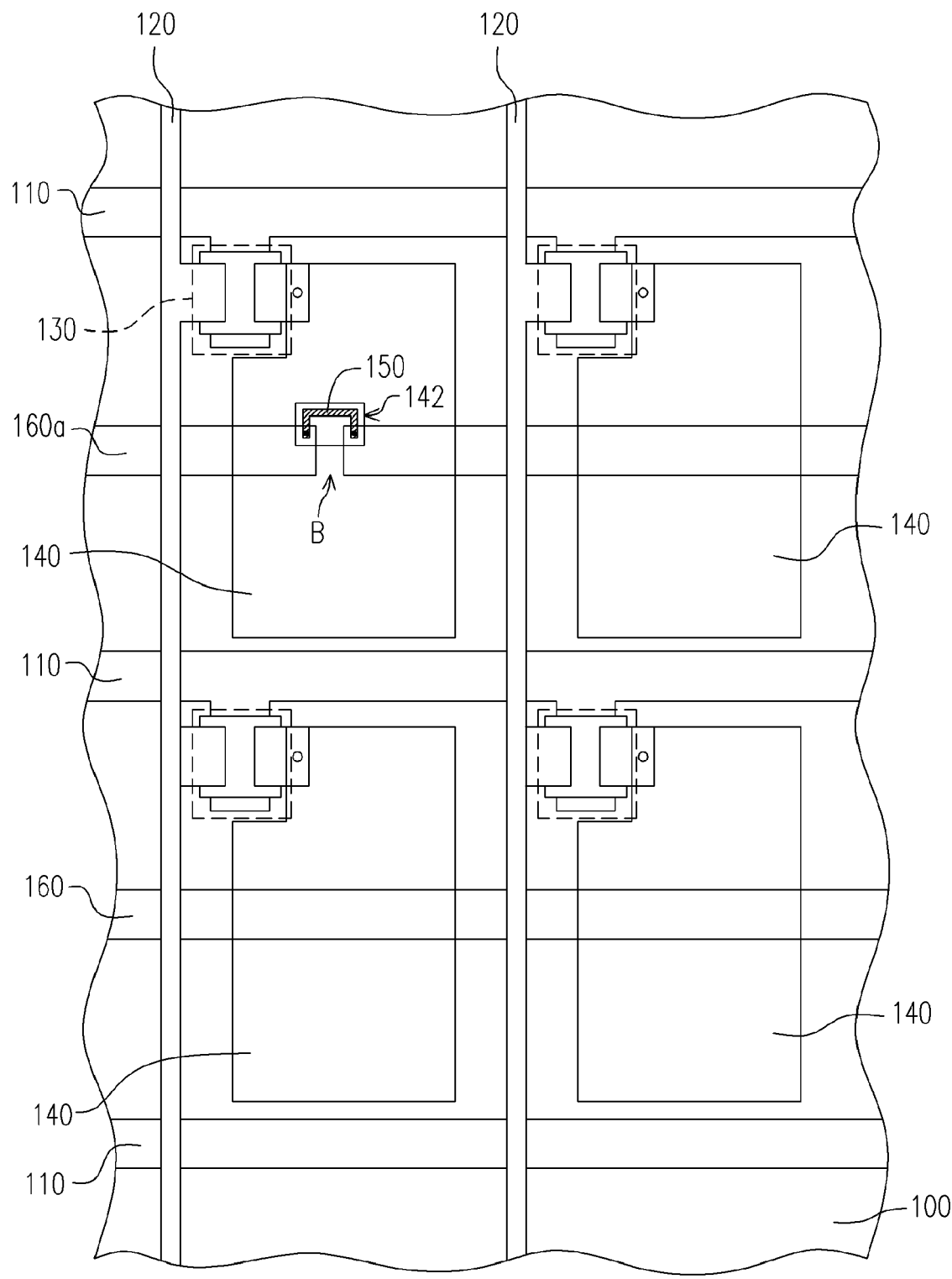
FIG. 3A to FIG. 3F are top views schematically illustrating a method for repairing a defect common line according to embodiments of the present invention.

Referring to FIG. 3A, when the break B of the defect common line 160a is disposed between any two of the data lines 120, the defect common line 160a may be repairing by using, for example but not limited to, the following steps. First, a portion of the pixel electrode 140 over the break B is removed to form an opening 142. Thereafter, a repairing circuit 150 is formed in the opening 142 to electrically connect the repairing circuit 150 to the defect common line 160a at two sides of the break B. Thus, the defect common line 160a is repaired.

Figure 3B:
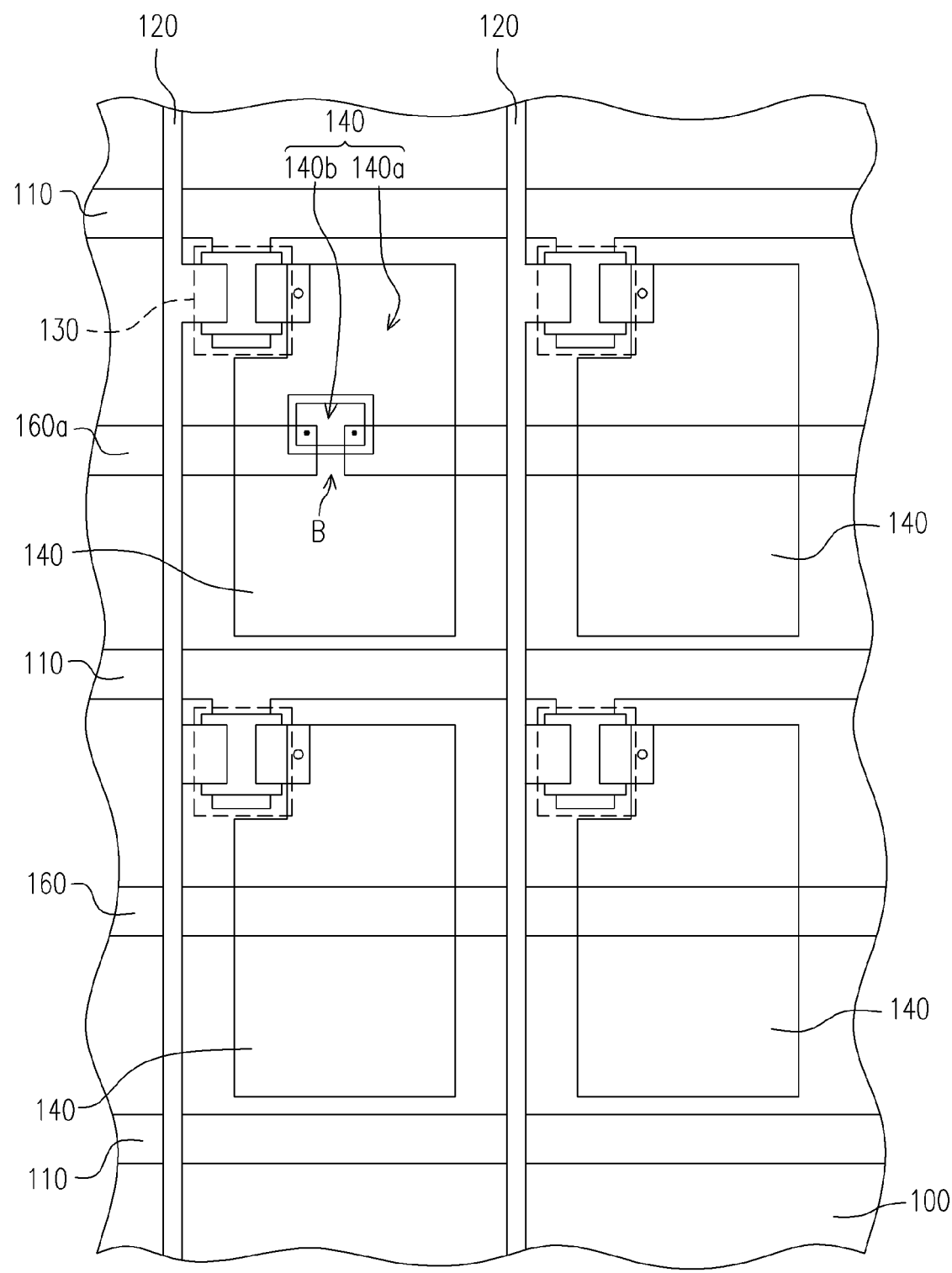

Referring to FIG. 3B, in one embodiment of the present invention, a portion of the pixel electrode 140 over the break B is removed to form a display area 140a and an and a repairing area 140b electrically insulated with the display area 140a. Thereafter, the repairing area 140b is electrically connected to the defect common line 160a at two sides of the break B.

Figure 3C:
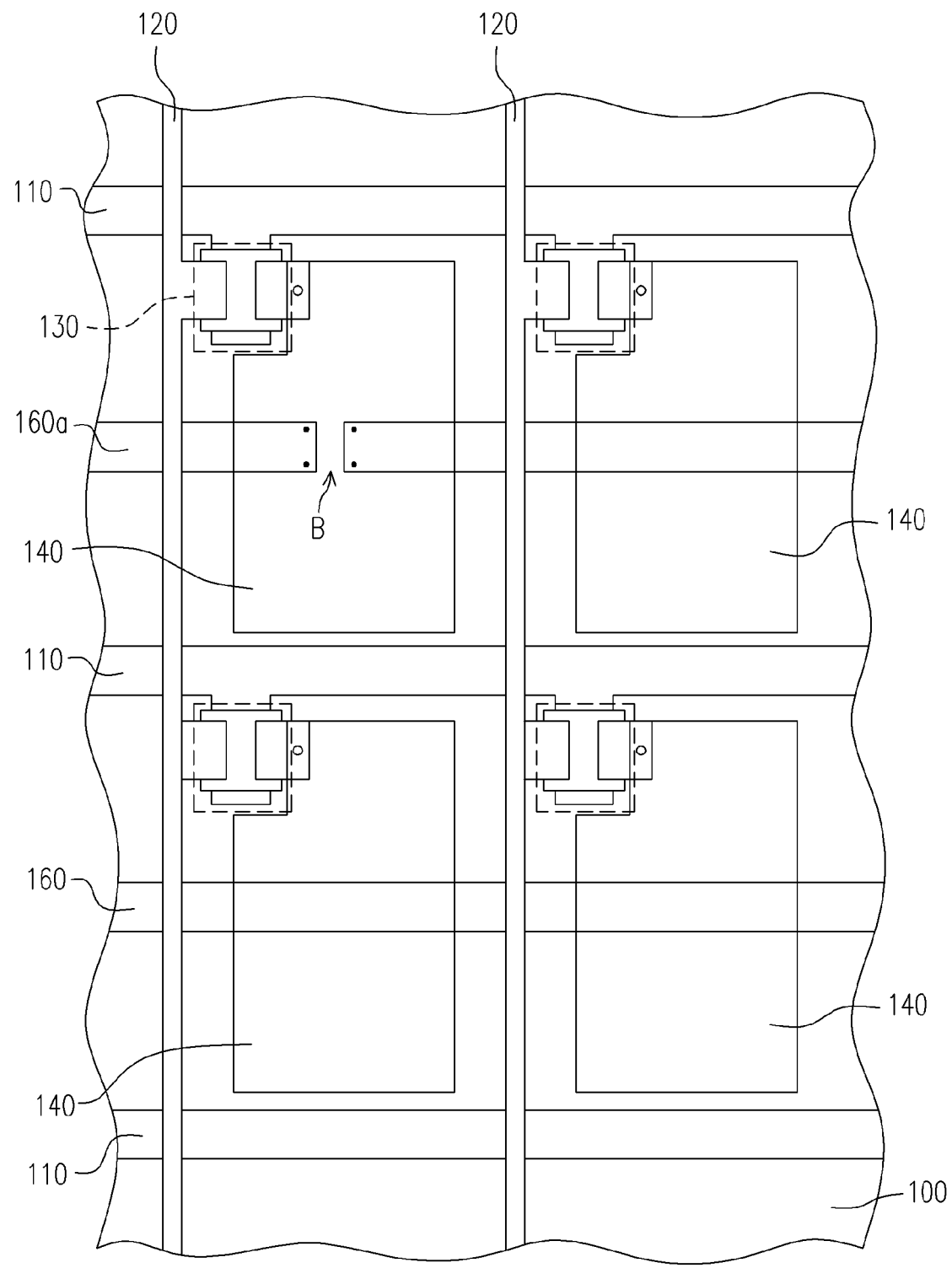

Referring to FIG. 3C, in one embodiment of the present invention, the pixel electrode 140 over the break B may be electrically connected to the defect common line 160a at two sides of the break B directly by using a laser welding method.

Figure 3D:
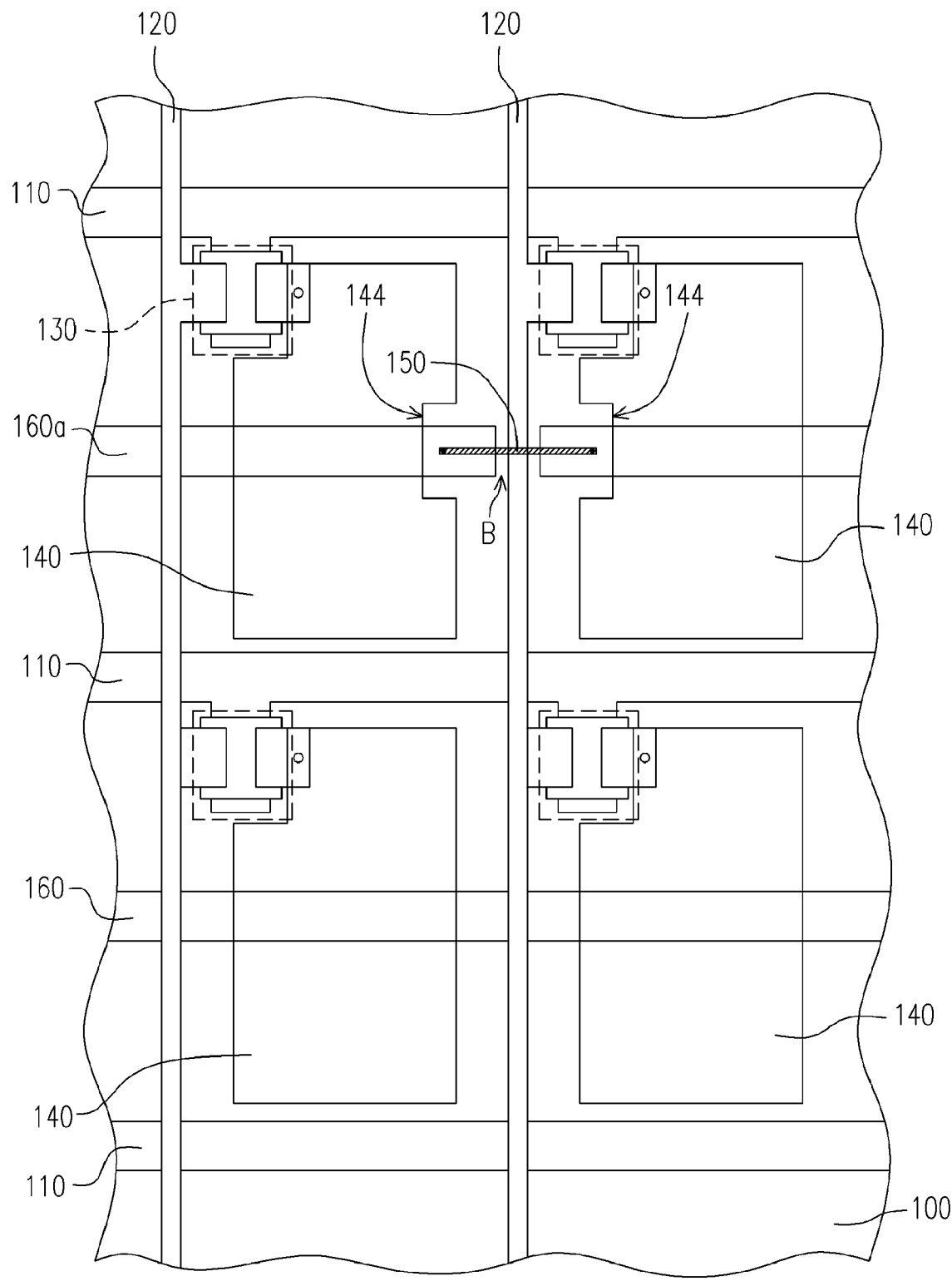

Referring to FIG. 3D, when the break B of the defect common line 160a is disposed under one of the data lines 120, the defect common line 160a may be repaired by, for example but not limited to, the following steps. First, a portion of two pixel electrodes 140 adjacent to the break B is removed to form a gap 144 at the edges of the two pixel electrodes 140 respectively. Thereafter, a repairing circuit 150 is formed and crosses over the data line 120, wherein the repairing circuit 150 is in the gap 144 and electrically connected to the defect common line 160a at two sides of the break B.

Figure 3E:
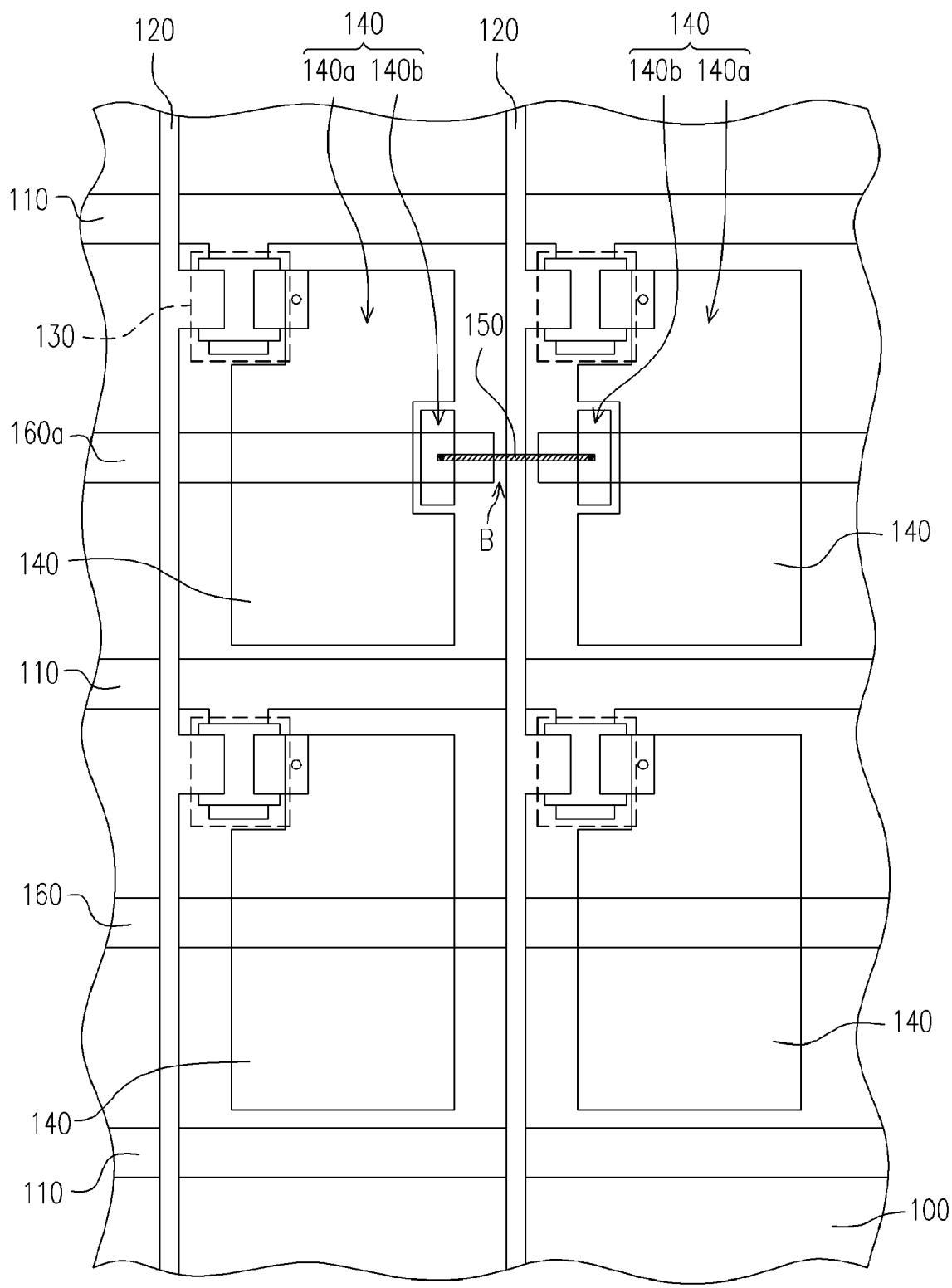

Referring to FIG. 3E, in one embodiment of the present invention, a portion of two pixel electrodes 140 adjacent to the remove break B may also be removed to form a display area 140a and a repairing area 140b electrically insulated with the display area 140a. Thereafter, a repairing circuit 150 is formed and crosses over the data line 120, wherein the repairing circuit 150 is electrically connected to the repairing area 140b and the defect common line 160a at two sides of the break B.

Figure 3F:
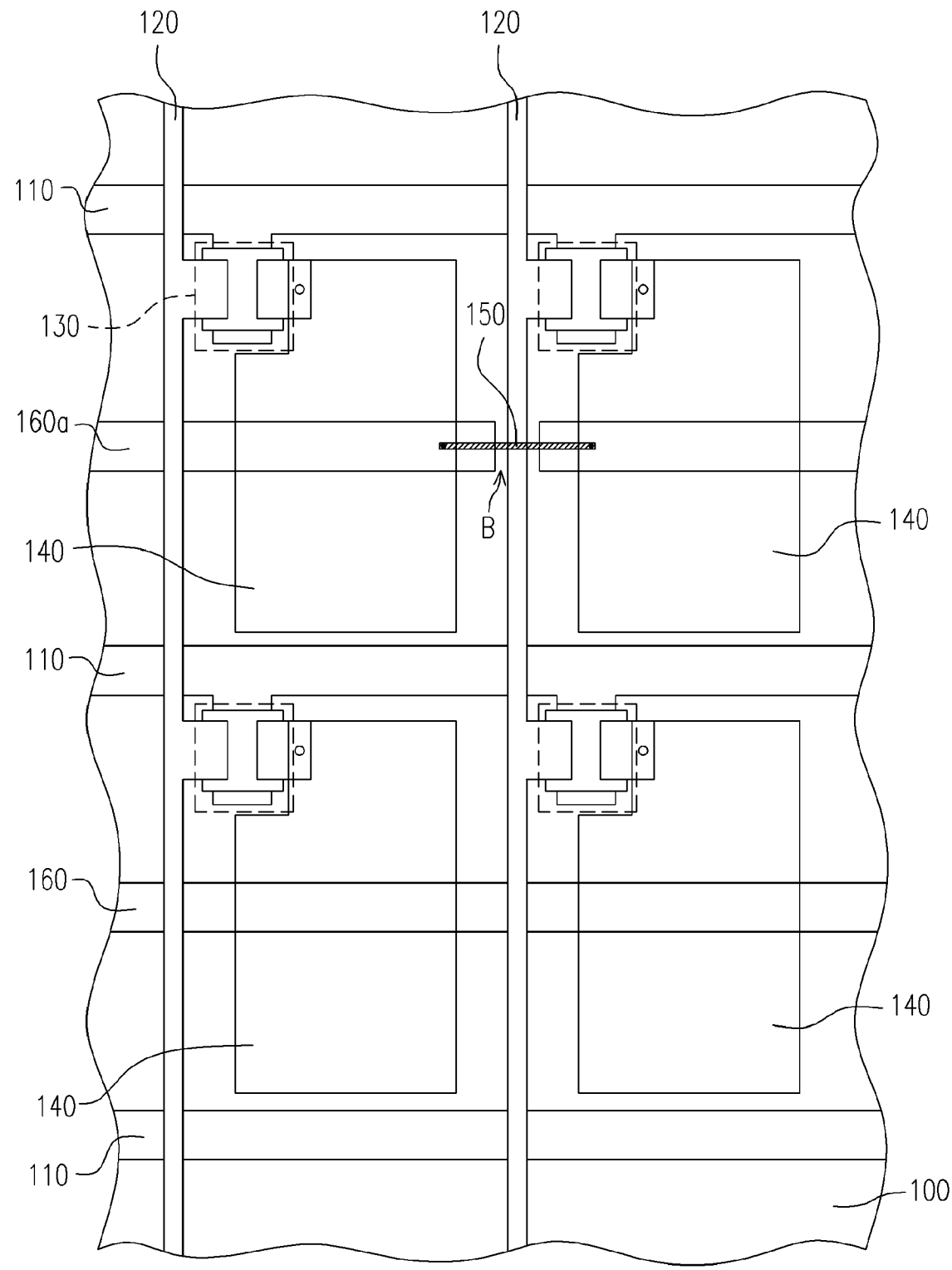

Referring to FIG. 3F, in one embodiment of the present invention, a repairing circuit 150 may be directly formed and crosses over the data line 120, and then the repairing circuit 150 is electrically connected to the defect common line 160a at two sides of the break B by using, for example, a laser welding method.

Accordingly, the repairing method of the present invention has the following advantages. First, the line defect generated in the scan line or the common line may be easily repaired by the repairing method of the present invention. The present invention is practicable. Next, the repairing method of the present invention is provided for repairing and converting the line defect into a two-point defect, a single defect, or even the defect is totally repaired (zero defect). Therefore, the yield is drastically enhanced.

The foregoing description of the preferred embodiment of the present invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A thin film transistor (TFT) array substrate, comprising:
a substrate;

a plurality of scan lines, disposed over the substrate, wherein the scan lines comprise at least a defect scan line comprising a break;

a plurality of data lines, disposed over the substrate, wherein a plurality of pixel areas are defined by the scan lines and the data lines;

a plurality of thin film transistors, connected with the scan lines and the data lines, wherein each of the thin film transistors is disposed in one of the pixel areas;

a plurality of pixel electrodes, wherein each of the pixel electrodes is disposed in one of the pixel areas and electrically connected to one of the thin film transistors correspondingly, and a portion of each of the pixel electrodes is disposed over one of the scan lines correspondingly to construct a storage capacitor; and a repairing circuit, disposed directly over the break for electrically connecting the defect scan line at two sides of the break, wherein the repairing circuit is electrically insulated with the pixel electrodes.

2. The TFT array substrate of claim 1, wherein the break of the defect scan line is between two of the data lines and one of the pixel electrodes comprises an opening corresponding to the break, wherein the repairing circuit is disposed in the opening to be electrically insulated with the one of the pixel electrodes.

3. The TFT array substrate of claim 1, wherein the break of the defect scan line is under one of the data lines and a gap is formed at an edge of two of the pixel electrodes adjacent to the break, wherein the repairing circuit crosses over one of the data lines and is in the gap to be electrically insulated with the pixel electrodes.

4. A thin film transistor (TFT) array substrate, comprising:
a substrate;
a plurality of scan lines, disposed over the substrate, wherein the scan lines comprise at least a defect scan line comprising a break;
a plurality of data lines, disposed over the substrate, wherein a plurality of pixel areas are defined by the scan lines and the data lines;
a plurality of thin film transistors, connected with the scan lines and the data lines, wherein each of the thin film transistors is disposed in one of the pixel areas;
a plurality of pixel electrodes, wherein each of the pixel electrodes is disposed in one of the pixel areas and electrically connected to one of the thin film transistors correspondingly, and a portion of each of the pixel electrodes is disposed over one of the scan lines correspondingly to construct a storage capacitor; and
a repairing circuit, disposed directly over the break, wherein the repairing circuit and at least one of the pixel electrodes are electrically connected with the defect scan lines at two sides of the break.

5. The TFT array substrate of claim 4, wherein the break of the defect scan line is under one of the data lines and two of the pixel electrodes adjacent to the break of the defect scan line respectively comprises:
a displaying portion; and
a repairing portion, electrically insulated with the displaying portion, wherein the repairing circuit and the repairing portion are electrically connected to the defect scan line at two sides of the break.

6. A thin film transistor (TFT) array substrate, comprising:
a substrate;
a plurality of scan lines, disposed over the substrate, wherein the scan lines comprise at least a defect scan line comprising a break;

a plurality of data lines, disposed over the substrate, wherein a plurality of pixel areas are defined by the scan lines and the data lines;

a plurality of thin film transistors, connected with the scan lines and the data lines, wherein each of the thin film transistors is disposed in one of the pixel areas; and a plurality of pixel electrodes, wherein each of the pixel electrodes is disposed in one of the pixel areas and electrically connected to one of the thin film transistors correspondingly, and a portion of each of the pixel electrodes is disposed over one of the scan lines correspondingly to construct a storage capacitor, wherein at least one of the pixel electrodes is electrically connected to the defect scan line at two sides of the break, wherein the break of the defect scan line is between two of the data lines and one of the pixel electrodes comprises:
a displaying portion; and
a repairing portion, electrically insulated with the displaying portion, wherein the repairing circuit and the repairing portion are electrically connected to the defect scan line at two sides of the break.

7. A thin film transistor (TFT) array substrate, comprising:
a substrate;
a plurality of scan lines, disposed over the substrate, wherein the scan lines comprise at least a defect scan line comprising a break;
a plurality of data lines, disposed over the substrate, wherein a plurality of pixel areas are defined by the scan lines and the data lines;
a plurality of thin film transistors, connected with the scan lines and the data lines, wherein each of the thin film transistors is disposed in one of the pixel areas; and
a plurality of pixel electrodes, wherein each of the pixel electrodes is disposed in one of the pixel areas and electrically connected to one of the thin film transistors correspondingly, and a portion of each of the pixel electrodes is disposed over one of the scan lines correspondingly to construct a storage capacitor, wherein at least one of the pixel electrodes is electrically connected to the defect scan line at two sides of the break, wherein the break of the defect scan line is under one of the data lines, the TFT array substrate further comprises:
a repairing circuit, crossing over one of the data lines, wherein the repairing line, two of the pixel electrodes adjacent to the break and the defect scan line at two sides of the break are electrically connected mutually.

8. A thin film transistor (TFT) array substrate, comprising:
a substrate;
a plurality of scan lines, disposed over the substrate;
a plurality of data lines, disposed over the substrate, wherein a plurality of pixel areas are defined by the scan lines and the data lines;
a plurality of thin film transistors, connected with the scan lines and the data lines, wherein each of the thin film transistors is disposed in one of the pixel areas; and
a plurality of pixel electrodes, wherein each of the pixel electrodes is disposed in one of the pixel areas and electrically connected to one of the thin film transistors correspondingly;
a plurality of common lines, disposed over the substrate, and a portion of each of the pixel electrodes is disposed over one of the common lines correspondingly to construct a storage capacitor, and the common lines comprise at least a defect common line comprising a break; and a repairing circuit, disposed directly over the break and electrically connected with the defect common line at two sides of the break, wherein the repairing circuit is electrically insulated with the pixel electrodes.

9. The TFT array substrate of claim 8, wherein the break of the defect common line is between two of the data lines, and one of the pixel electrodes comprises an opening corresponding to the break, and the repairing circuit is disposed in the opening to be electrically insulated with one of the pixel electrodes.

10. The TFT array substrate of claim 8, wherein the break of the defect common line is under one of the data lines, and a gap is formed at an edge of two of the pixel electrodes adjacent to the break, and the repairing circuit crosses over one the data lines and is in the gap to be electrically insulated with the pixel electrodes.

11. A thin film transistor (TFT) array substrate, comprising:
a substrate;
a plurality of scan lines, disposed over the substrate;
a plurality of data lines, disposed over the substrate, wherein a plurality of pixel areas are defined by die scan lines and the data lines;
a plurality of thin film transistors, connected with the scan lines and the data lines, wherein each of the thin film transistors is disposed in one of the pixel areas; and
a plurality of pixel electrodes, wherein each of the pixel electrodes is disposed in one of the pixel areas and electrically connected to one of the thin film transistors correspondingly;
a plurality of common lines, disposed over the substrate, and a portion of each of the pixel electrodes is disposed over one of the common lines correspondingly to construct a storage capacitor, and the common lines comprise at least a defect common line comprising a break; and
a repairing circuit, disposed directly over the break, wherein the repairing circuit and at least one of the pixel electrodes are electrically connected to the defect common line at two sides of the break.

12. The TFT array substrate of claim 11, wherein the break of the defect common line is under one of the data lines and two of the pixel electrodes adjacent to the break of the defect common line respectively comprise:
a displaying portion; and
a repairing portion, electrically insulated with the displaying portion, wherein the repairing circuit and the repairing portion are electrically connected to the defect common line at two sides of the break.

13. A thin film transistor (TFT) array substrate, comprising:
a substrate;
a plurality of scan lines, disposed over the substrate;
a plurality of data lines, disposed over the substrates wherein a plurality of pixel areas are defined by the scan lines and the data lines;
a plurality of thin film transistors, connected with the scan lines and the data lines, wherein each of the thin film transistors is disposed in one of the pixel areas; and
a plurality of pixel electrodes, wherein each of the pixel electrodes is disposed in one of the pixel areas and electrically connected to one of the thin film transistors correspondingly; and
a plurality of common lines, disposed over the substrate, and a portion of each of the pixel electrodes Is disposed over one of the common lines correspondingly to construct a storage capacitor, and the common lines comprise at least a defect common line comprising a break, wherein at least one of the pixel electrodes is electrically connected to the defect common line at two sides of the break, wherein the break of the defect common line is between two of the data lines and one of the pixel electrodes comprises:
a displaying portion; and
a repairing portion, electrically insulated with the displaying portion, wherein the repairing circuit and the repairing portion are electrically connected to the defect common line at two sides of the break.

14. A thin film transistor (TFT) array substrate, comprising:
a substrate:
a plurality of scan lines, disposed over the substrate;
a plurality of data lines, disposed ova the substrate, wherein a plurality of pixel areas are defined by the scan lines and the data lines;
a plurality of thin film transistors, connected with the scan lines and the data lines, wherein each of the thin film transistors is disposed in one of the pixel areas; and
a plurality of pixel electrodes, wherein each of the pixel electrodes is disposed in one of the pixel areas and electrically connected to one of the thin film transistors correspondingly; and
a plurality of common lines, disposed over the substrate, and a portion of each of the pixel electrodes is disposed over one of the common lines correspondingly to construct a storage capacitor, and the common lines comprise at least a defect common line comprising a break, wherein at least one of the pixel electrodes is electrically connected to the defect common line at two sides of the break, wherein the break of the defect common line is under one of the data lines, the TFT array substrate further comprises:
a repairing circuit, crossing over one of the data lines, wherein the repairing line, two of the pixel electrodes adjacent to the break and the defect common line at two sides of the break are electrically connected mutually.

* * * * *